US007698263B2

(12) United States Patent
Pickelsimer et al.

(10) Patent No.: US 7,698,263 B2
(45) Date of Patent: Apr. 13, 2010

(54) PROVIDING A LATERAL SEARCH

(75) Inventors: Lisa A. Pickelsimer, Atlanta, GA (US); Anant Patil, Marietta, GA (US); Joshua Musick, Brooklyn, NY (US); Robert Fabricant, Brooklyn, NY (US); David Werner, San Francisco, CA (US)

(73) Assignee: Cox Communications, Inc., Atlanta, GA (US)

( * ) Notice: Subject to any disclaimer, the term of this patent is extended or adjusted under 35 U.S.C. 154(b) by 226 days.

(21) Appl. No.: 11/787,733

(22) Filed: Apr. 17, 2007

(65) Prior Publication Data
US 2008/0177727 A1    Jul. 24, 2008

Related U.S. Application Data

(60) Provisional application No. 60/881,888, filed on Jan. 23, 2007, provisional application No. 60/897,341, filed on Jan. 25, 2007.

(51) Int. Cl.
G06F 17/30 (2006.01)

(52) U.S. Cl. ............................ 707/3; 707/5; 707/104.1; 715/717; 715/719; 725/39; 725/40; 725/44; 725/45; 725/139

(58) Field of Classification Search .................. 707/5, 707/140.1; 725/39–40, 44–45, 61, 135, 139, 725/158; 715/717–719
See application file for complete search history.

(56) References Cited

U.S. PATENT DOCUMENTS

| 6,615,248 | B1* | 9/2003 | Smith .......................... 709/217 |
| 6,934,963 | B1 | 8/2005 | Reynolds et al. ............... 725/39 |
| 7,584,214 | B2* | 9/2009 | Narahara et al. ......... 707/104.1 |
| 7,596,761 | B2 | 9/2009 | Lemay et al. ................ 715/779 |
| 2002/0087982 | A1 | 7/2002 | Stuart .......................... 725/539 |
| 2002/0194195 | A1* | 12/2002 | Fenton et al. ............ 707/104.1 |
| 2004/0034867 | A1 | 2/2004 | Rashkovskiy et al. ......... 725/40 |
| 2004/0255336 | A1* | 12/2004 | Logan et al. ................. 725/135 |
| 2005/0278740 | A1 | 12/2005 | Helms .......................... 725/41 |

(Continued)

OTHER PUBLICATIONS

J. Bouwen et al., "Communication Meets Entertainment: Community Television," Technology White Paper, Alcatel Telecommunication Review, 1$^{st}$ Quarter 2005, pp. 1-8, http://www.alcatel.com/doctypes/articlepaperlibrary/pdf/ATR2005O1/T0503-Community_TV-EN.pdf.

(Continued)

*Primary Examiner*—Don Wong
*Assistant Examiner*—Hanh B Thai
(74) *Attorney, Agent, or Firm*—Merchant & Gould

(57) ABSTRACT

Systems and methods are disclosed for providing a lateral search. First, a media guide may be displayed comprising at least one display element. The at least one display element may comprise an action card configured to display a plurality of actions that can be taken with respect to a selected program. One of the plurality of actions may comprise a search action. In addition, in response to a user selecting a user selectable element corresponding to the search action on the action card, a search card may be displayed. The search card may be configured to display a plurality of search options comprising, for example, an upcoming episodes search option, a related programs search option, a related personalities search option, and a related key word search option.

18 Claims, 9 Drawing Sheets

U.S. PATENT DOCUMENTS

| | | | |
|---|---|---|---|
| 2006/0041927 A1* | 2/2006 | Stark et al. | 725/139 |
| 2006/0080408 A1* | 4/2006 | Istvan et al. | 709/219 |
| 2006/0130093 A1 | 6/2006 | Feng et al. | 725/39 |
| 2006/0248557 A1* | 11/2006 | Stark et al. | 725/37 |
| 2006/0253874 A1* | 11/2006 | Stark et al. | 725/62 |
| 2008/0126936 A1* | 5/2008 | Williams | 715/717 |
| 2008/0155600 A1* | 6/2008 | Klappert et al. | 725/44 |
| 2008/0163307 A1* | 7/2008 | Coburn et al. | 725/61 |
| 2008/0168506 A1 | 7/2008 | Pickelsimer | |
| 2008/0178218 A1 | 7/2008 | Pickelsimer | |
| 2008/0263595 A1* | 10/2008 | Sumiyoshi et al. | 725/39 |
| 2008/0276278 A1* | 11/2008 | Krieger et al. | 725/40 |
| 2009/0049098 A1 | 2/2009 | Pickelsimer et al. | |
| 2009/0049473 A1 | 2/2009 | Pickelsimer et al. | |
| 2009/0055743 A1 | 2/2009 | Pickelsimer et al. | |
| 2009/0063994 A1 | 3/2009 | Pickelsimer et al. | |
| 2009/0094643 A1 | 4/2009 | Pickelsimer et al. | |
| 2009/0313664 A1 | 12/2009 | Patil et al. | |

OTHER PUBLICATIONS

U.S. Appl. No. 11/651,140, filed Jan. 9, 2007 entitled "Providing User Communication".
U.S. Appl. No. 11/787,732, filed Apr. 17, 2007 entitled "Providing a Video User Interface".
U.S. Appl. No. 12/126,096, filed May 23, 2008 entitled "Providing a Content Mark".
U.S. Appl. No. 12/126,165, filed May 23, 2008 entitled "Providing a Customized User Interface".
U.S. Appl. No. 12/126,025, filed May 23, 2006 entitled "Providing a Video User Interface".
U.S. Appl. No. 12/126,060, filed May 23, 2008 entitled "Providing a Social Network".
U.S. Appl. No. 12/126,126, filed May 23, 2008 entitled "Providing a User Interface".
Copending U.S. Appl. No. 12/545,099, filed Aug. 21, 2009 entitled "Providing a Video User Interface".
U.S. Office Action dated Jun. 22, 2009 cited in U.S. Appl. No. 11/787,732.

* cited by examiner

PROVIDING A LATERAL SEARCH

RELATED APPLICATIONS

Under provisions of 35 U.S.C. § 119(e), Applicant claims the benefit of U.S. provisional application Ser. No. 60/881,888, entitled "Columnar Media Guide," filed Jan. 23, 2007, and U.S. provisional application Ser. No. 60/897,341 entitled "Columnar Media Guide," filed Jan. 25, 2007, both of which are hereby incorporated by reference. Related U.S. patent application Ser. No. 11/787,732, filed on even date herewith in the name of Lisa A. Pickelsimer and entitled "Providing a Video User Interface," assigned to the assignee of the present application, is also hereby incorporated by reference. The present application is related to U.S. application Ser. No. 11/651,140, filed on Jan. 9, 2007, U.S. application Ser. No. 12/126,025, entitled "PROVIDING A VIDEO USER INTERFACE", U.S. application Ser. No. 12/126,060, entitled "PROVIDING A SOCIAL NETWORK", U.S. application Ser. No. 12/126,096, entitled "PROVIDING A CONTENT MARK", U.S. application Ser. No. 12/126,126, entitled "PROVIDING A USER INTERFACE", and U.S. application Ser. No. 12/126,165, entitled "PROVIDING A CUSTOMIZED USER INTERFACE".

BACKGROUND

Service providers may deliver content to a user over a content delivery system. For example, conventional content delivery systems distribute the content to a first user and a second user independently. In other words, the first user may watch a sports program while the second user may simultaneously watch a video-on-demand program. Furthermore, service providers may provide along with the content, a grid-like guide showing what content is available at what time. Independent content use, however, does not create a socialized entertainment sense with the users. In addition, the grid-like guide provides very little interactive functionality. Consequently, the first user may be socially detached and isolated from the second user and the service provider. Stated another way, the conventional content delivery system may present an impersonal and unsocial user experience.

SUMMARY OF THE INVENTION

Consistent with embodiments of the present invention, systems and methods are disclosed for providing a lateral search. First, a media guide may be displayed comprising at least one display element. The at least one display element may comprise an action card configured to display a plurality of actions that can be taken with respect to a selected program. One of the plurality of actions may comprise a search action. In addition, in response to a user selecting a user selectable element corresponding to the search action on the action card, a search card may be displayed. The search card may be configured to display a plurality of search options comprising at least two of the following: an upcoming episodes search option, a related programs search option, a related personalities search option, and a related key word search option.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
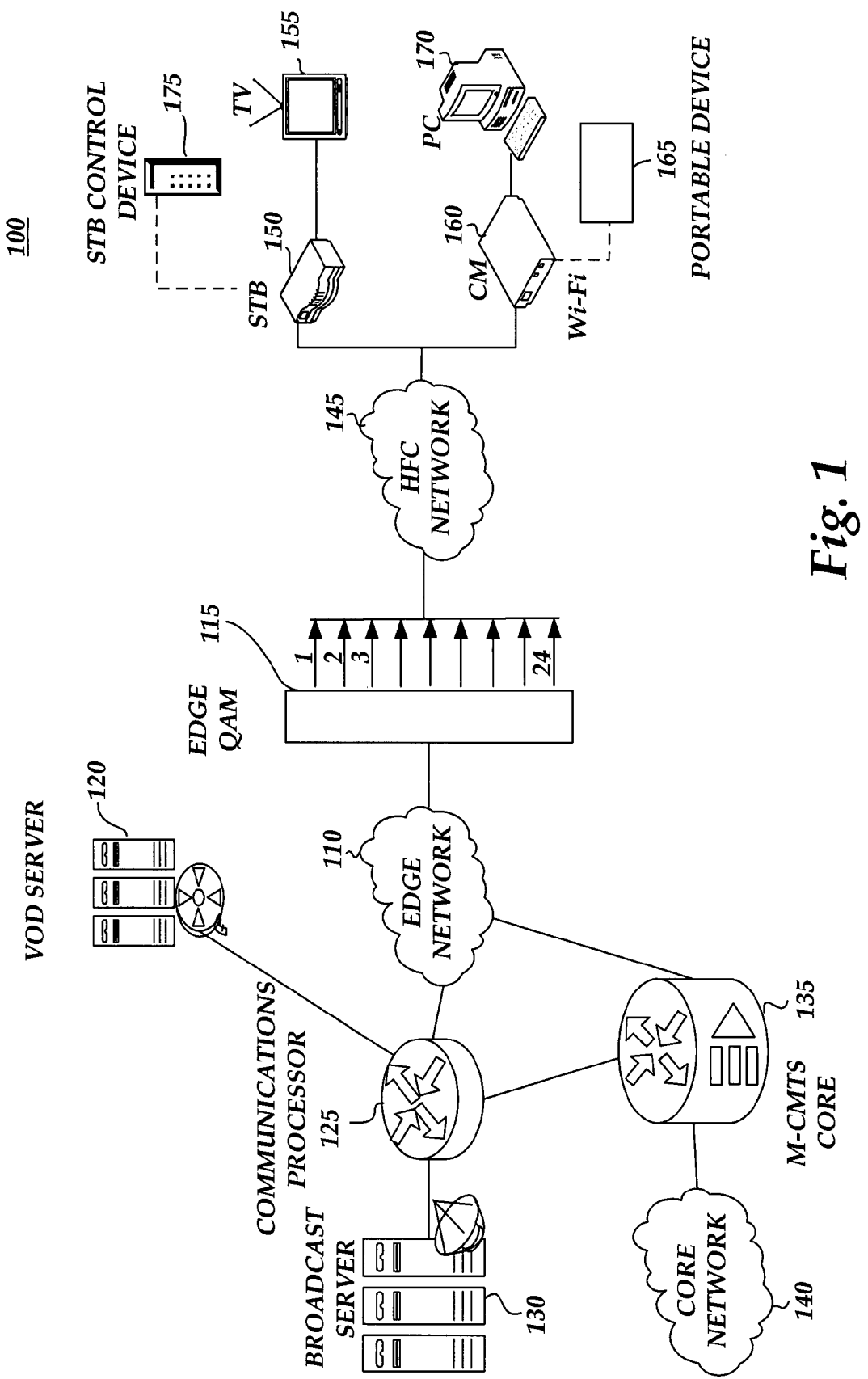
FIG. 1 is a block diagram of an operating environment including an application server.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system. In conventional systems, service providers may provide along with the content, a grid-like guide showing what content is available at what time. The conventional grid-like guide, however, provides very little interactive functionality. Consequently, the user may be socially detached and isolated from other users or the service provider. Consistent with embodiments of the invention, a lateral search may be provided. First, a media guide may be displayed comprising at least one display element. The at least one display element may comprise an action card configured to display a plurality of actions that can be taken with respect to a selected program. One of the plurality of actions may comprise a search action. In addition, in response to a user selecting a user selectable element corresponding to the search action on the action card, a search card may be displayed. The search card may be configured to display a plurality of search options comprising, for example, an upcoming episodes search option, a related programs search option, a related personalities search option, and a related key word search option. Consequently, by using the media guide, the user may be provided a way to conduct lateral searches.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a communications processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175.

Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 145 may provide a high-speed backbone for broadband services. Coaxial cable may connect end users in HFC network 145 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, CM 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a liquid crystal display unit (LCD), a video projection unit, STB 150 or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing a lateral search. The system may comprise a memory storage and a processing unit coupled to the memory storage. The processing unit may be operative to display a media guide comprising at least one display element. The at least one display element may comprise an action card configured to display a plurality of actions that can be taken with respect to a selected program. One of the plurality of actions may comprise a search action. In addition, the processing unit may be operative to display, in response to a user selecting a user selectable element corresponding to the search action on the action card, a search card. The search card may be configured to display a plurality of search options comprising at least two of the following: an upcoming episodes search option, a related programs search option, a related personalities search option, and a related key word search option.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
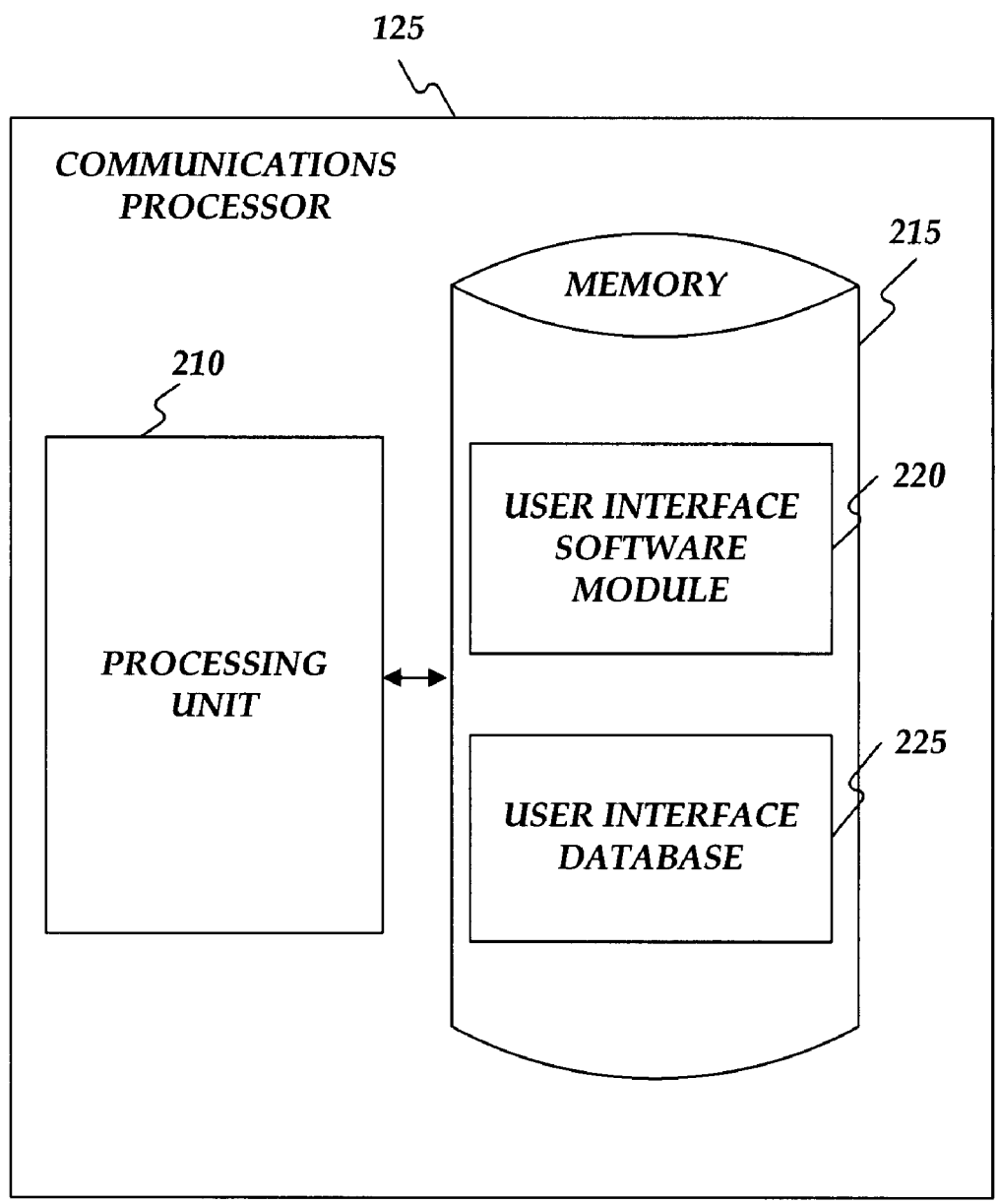
FIG. 2 is a block diagram of the communications processor.

FIG. 2 shows communications processor 125 of FIG. 1 in more detail. As shown in FIG. 2, communications processor 125 may include a processing unit 210 and a memory unit 215. Memory 215 may include a user interface software module 220 and a user interface database 225. While executing on processing unit 210, user interface software module 220 may perform processes for providing a user interface, including, for example, one or more stages included in method 300 described below with respect to FIG. 3. Furthermore, user interface software module 220 and user interface database 225 may be executed on or reside in any element shown in FIG. 1. Moreover, any one or more of the stages included in method 300 may be performed on any element shown in FIG. 1 including, but not limited to, STB 150, TV 155, CM 160, PC 170, or portable device 165.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
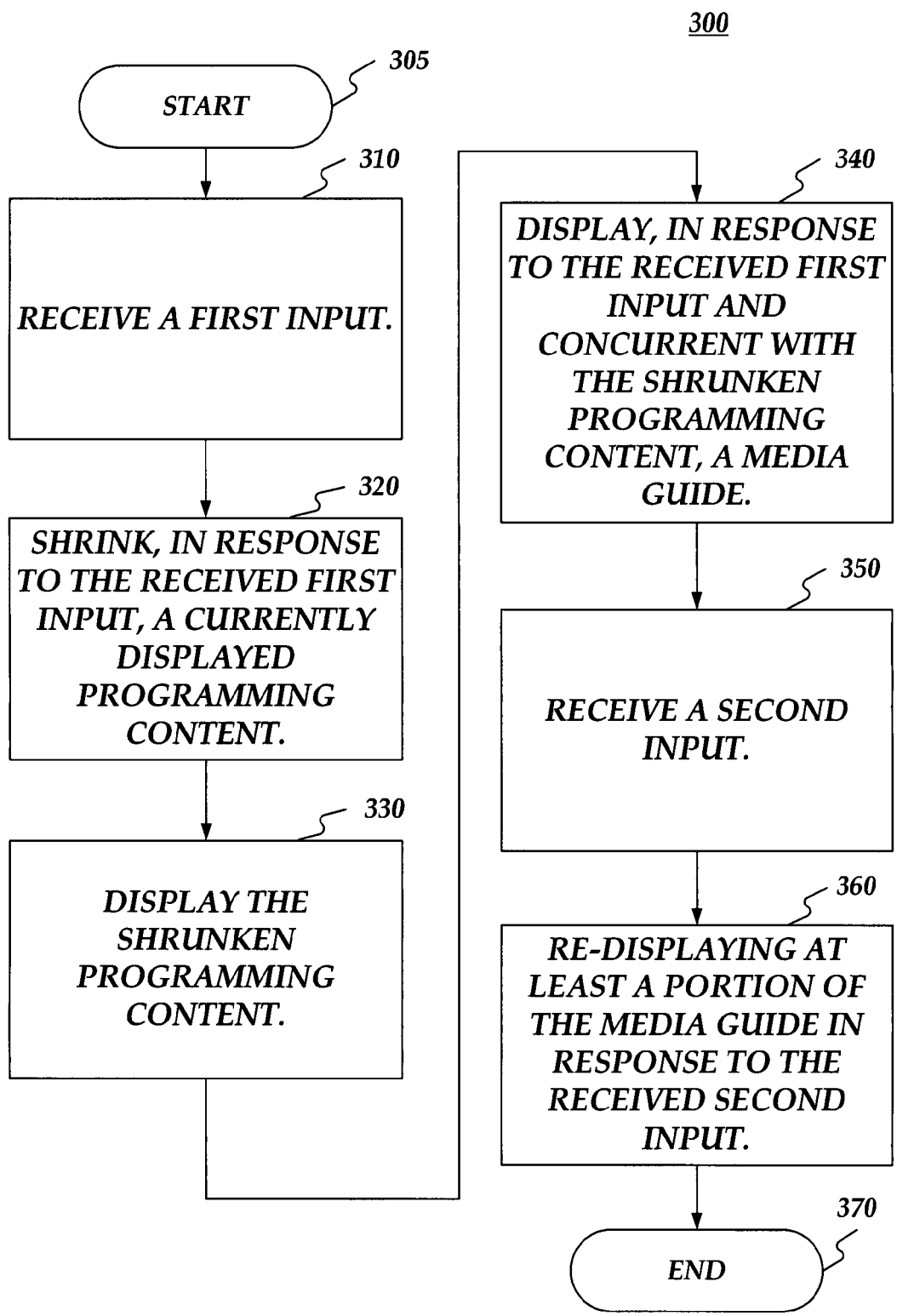
FIG. 3 is a flow chart of a method for providing a lateral search.
Figure 4:
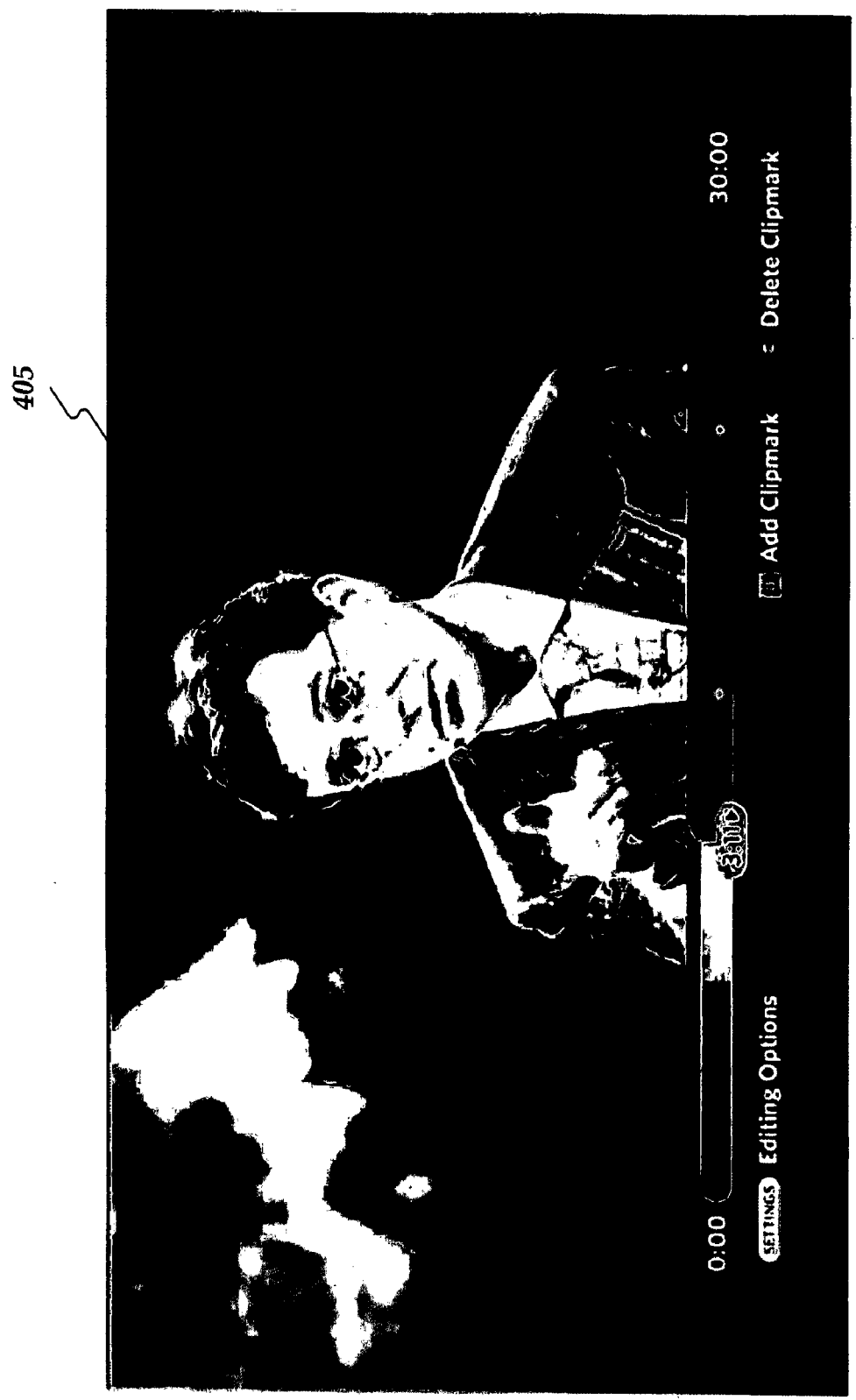
FIG. 4 is a diagram illustrating programming content.

FIG. 3 is a flow chart setting forth the general stages involved in a method 300 consistent with an embodiment of the invention for providing a lateral search. Method 300 may be implemented using communications processor 125 as described in more detail above with respect to FIG. 2. Ways to implement the stages of method 300 will be described in greater detail below. Method 300 may begin at starting block 305 and proceed to stage 310 where communications processor 125 may receive a first input. For example, as shown in FIG. 4, a user may be viewing a programming content 405 on TV 155. While viewing programming content 405, the user may desire to use a media guide. Accordingly, the user may press a button on control device 175 associated with the media guide. Once the button is pressed, control device 175 may send the first input to STB 150 that may then send the first input to communications processor 125. Furthermore, as another example, a menu (not shown) may be placed on programming content 405 on TV 155. The user may then select, using control device 175, an element from the menu associated with the media guide. In response to the user selecting this element, STB 150 may send the first input to communications processor 125. The aforementioned are examples, and the user may view programming content 405 on any device including, but not limited to, portable device 165 and PC 170. Furthermore, the first input may be communicated to communications processor 125 in any way.

Figure 5:
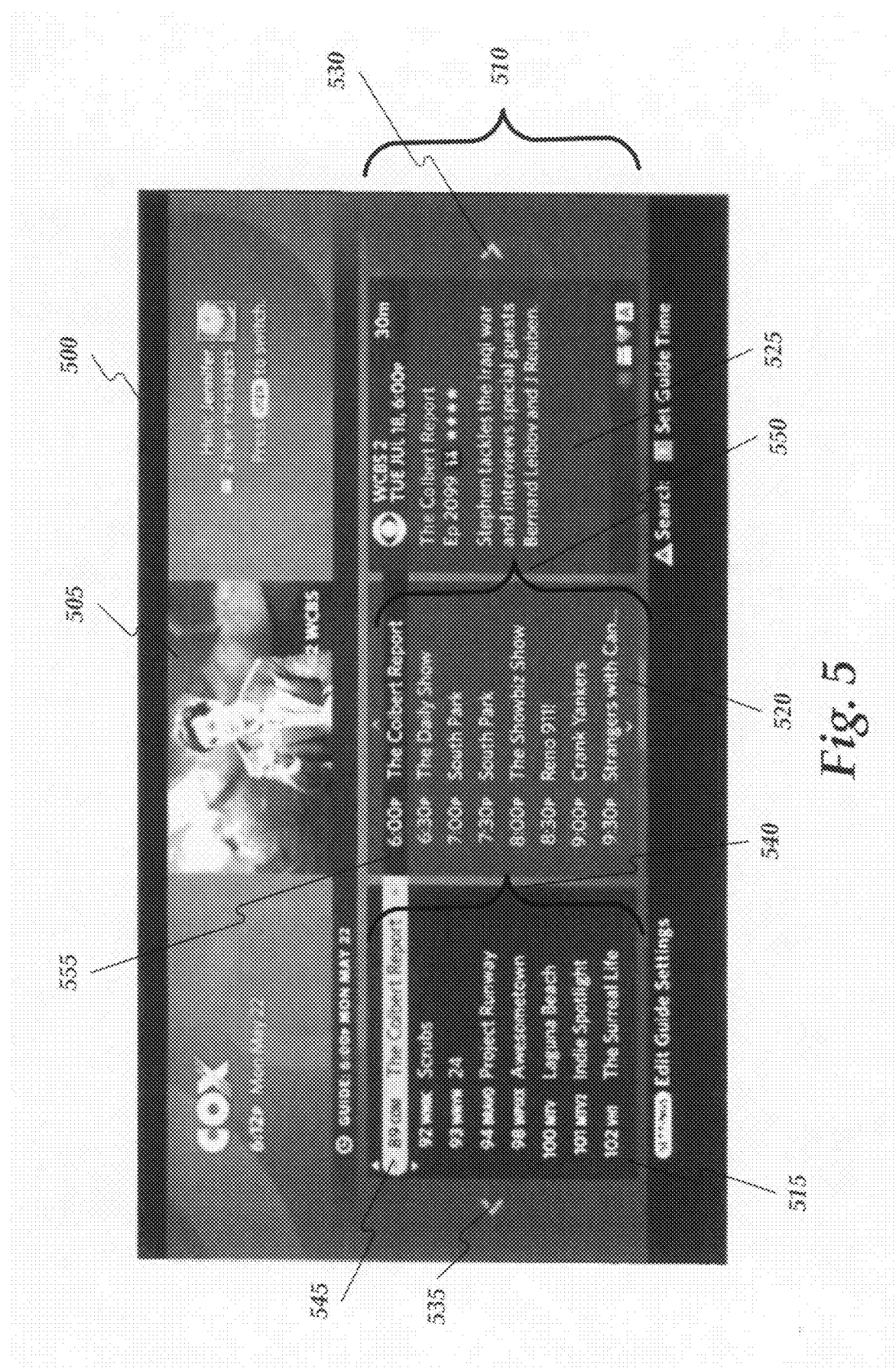
FIG. 5 is a diagram illustrating a media guide.

From stage 310, where communications processor 125 receives the first input, method 300 may advance to stage 320 where communications processor 125 may shrink currently displayed programming content 405. Once communications processor 125 shrinks currently displayed programming content 405 in stage 320, method 300 may continue to stage 330 where communications processor 125 may display a shrunken programming content 505 as shown in FIG. 5. For example, in response to the first input, communications processor 125 may display on TV 155 shrunken programming content 505. Shrunken programming content 505, for example, may comprise a shrunken version of programming content 405. Furthermore, shrunken programming content 505 may correspond to the currently selected program when the guide is first invoked (i.e., the guide comes up on time, on channel.) However, when the user navigates to other programming in the guide, new descriptive information may be provided in the third content element, but shrunken programming content 505 may remain on the channel the user was last viewing just prior to invoking the guide.

Figure 10:
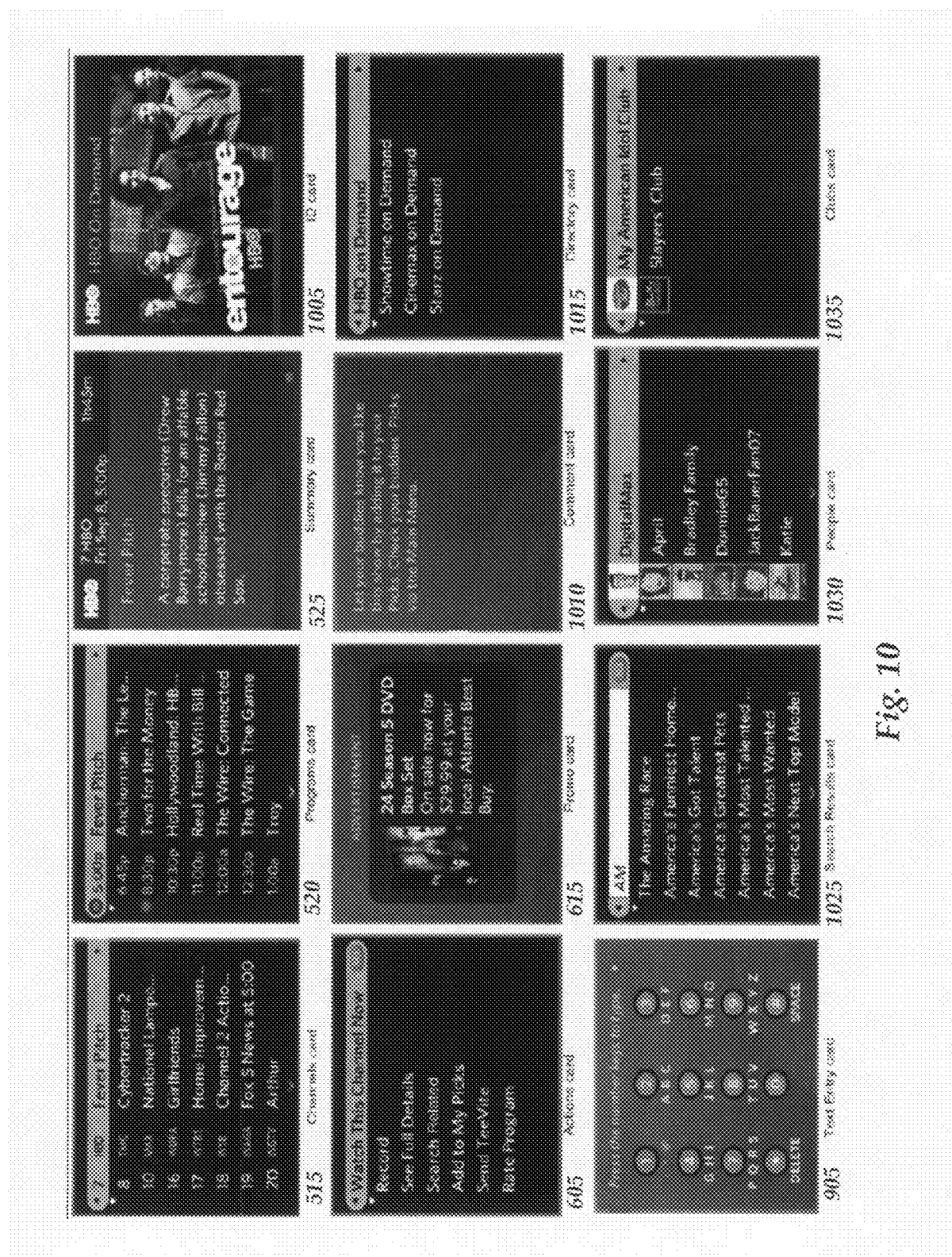
FIG. 10 shows a plurality of content element examples.

After communications processor 125 displays shrunken programming content 505 in stage 330, method 300 may proceed to stage 340 where communications processor 125 may display, in response to the received first input and concurrent with shrunken programming content 505, a media guide 510 as shown in FIG. 5. Shrunken programming content 505 and media guide 510 may be displayed in combination as display 500. Display 500, for example, may be configured to fit at least the width of a high-definition television (HDTV) display. Media guide 510 may comprise at least three display elements, for example, a first card 515, a second card 520, and a third card 525. While FIG. 5 shows three display elements, more than three may be used. For example, any of the at least three display elements may comprise a first content element, a second content element, a third content element, a fourth continent element, and a fifth content element. The aforementioned five content elements will be described in more detail below. Furthermore, as will also be described in more detail below, FIG. 10 shows a plurality of content element examples that may be used consistent with embodiments of the invention.

First card 515 in FIG. 5 shows an example of a first content element. The first content element may be configured to display a plurality of available programming channels 540 available, for example, from the service provider over content delivery system 100. A selected one of the plurality of available programming channels 545 may correspond to programming content currently displayed (e.g. shrunken programming content 505). Additional programming channels may be displayed in the first content element by scrolling the first content element.

Second card 520 in FIG. 5 shows an example of a second content element. The second content element may be configured to display a plurality of programs 550 available, for example, on selected one of the plurality of available programming channels 545. In addition, the second content element may be configured to display the plurality of programs available during, for example, a predetermined time period. As shown in FIG. 5, the second content element shows plurality of programs 550 available between 6:00 PM and 9:30 PM on selected one of the plurality of available programming channels 545. A program 555, within plurality of programs 550, corresponding to programming content currently displayed (e.g. shrunken programming content 505) may be highlighted.

Third card 525 in FIG. 5 shows an example of a third content element. The third content element may be configured to display description information corresponding to one of the plurality of programs. For example, the third content element shown in FIG. 5 shows description information corresponding to selected one of the plurality of available programming channels 545. In other words, the description information in the third content element may describe what was, is, or will be presented in program 555. As will be described in greater detail below, the description information displayed in the third content element may be toggled between varying degrees of less detailed information and more detailed information.

Figure 6:
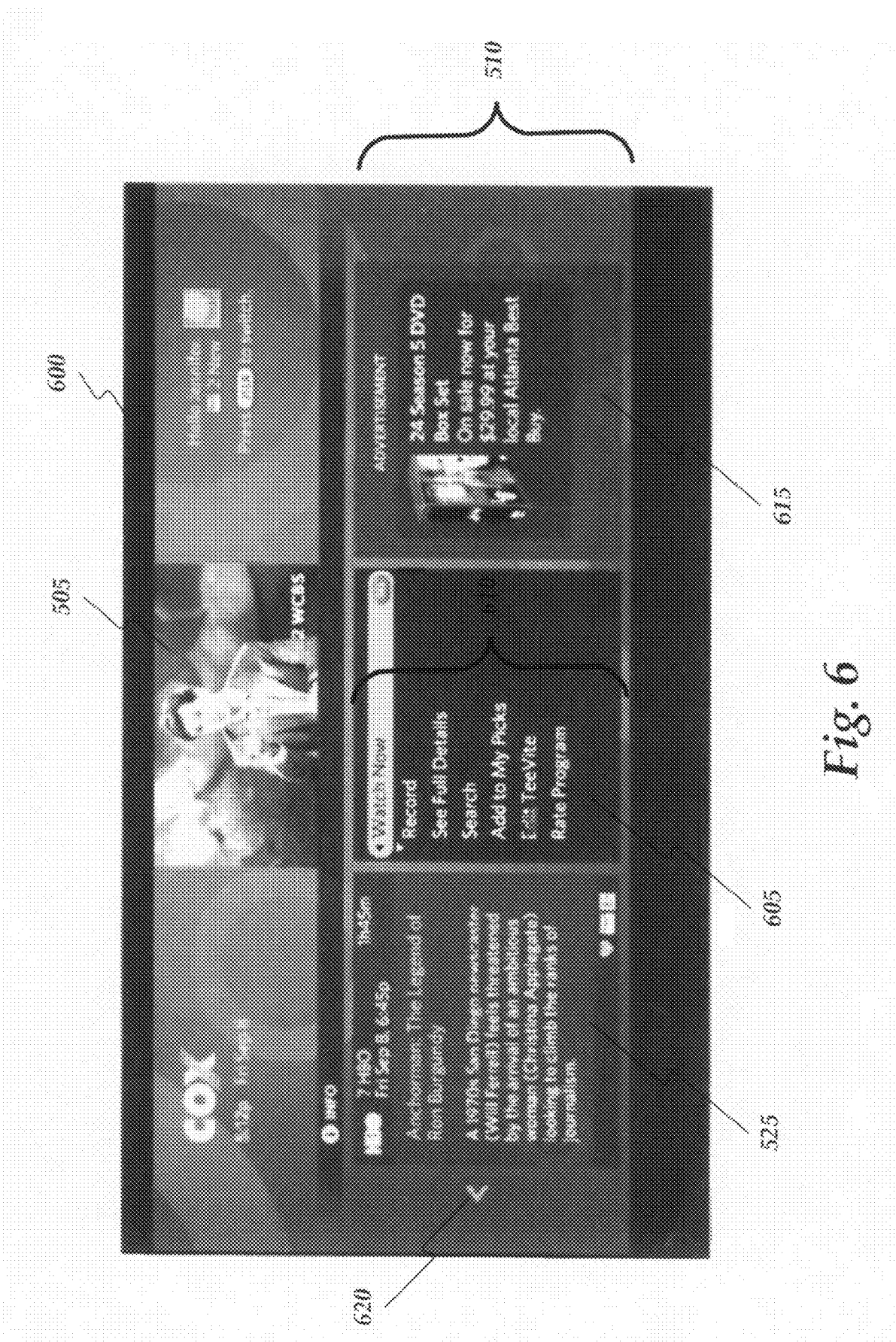
FIG. 6 is a diagram illustrating another media guide.

FIG. 6 shows another example of a display as display 600 including shrunken programming content 505 and media guide 510. Display 600 shows examples of the aforementioned fourth content element and fifth content element. As shown in FIG. 6. fourth card 605 (e.g. an action card) shows an example of the fourth content element. The fourth content element may be configured to display a plurality of actions 610 that can be taken with respect to one of the plurality of programs (e.g. program 555). For example, plurality of actions 610 may comprise, but are not limited to, a watch now action, a record action, a see full details action, a search action, an add to my picks action, a send an invitation action, and a rate program action. Selecting the watch now action may display content associated with a program selected in second card 520. Selecting the record action may cause a program selected in second card 520 to be recorded. In addition, selecting the see full details action may cause full details associated with a program selected in second card 520 to be displayed. Long description information associated with the full details may comprise an overlay rather than being displayed in the third content element because more space may be used to display all of the information. Deselecting the see full details action may cause a short version of the details to be displayed in third card 525.

Figure 7:
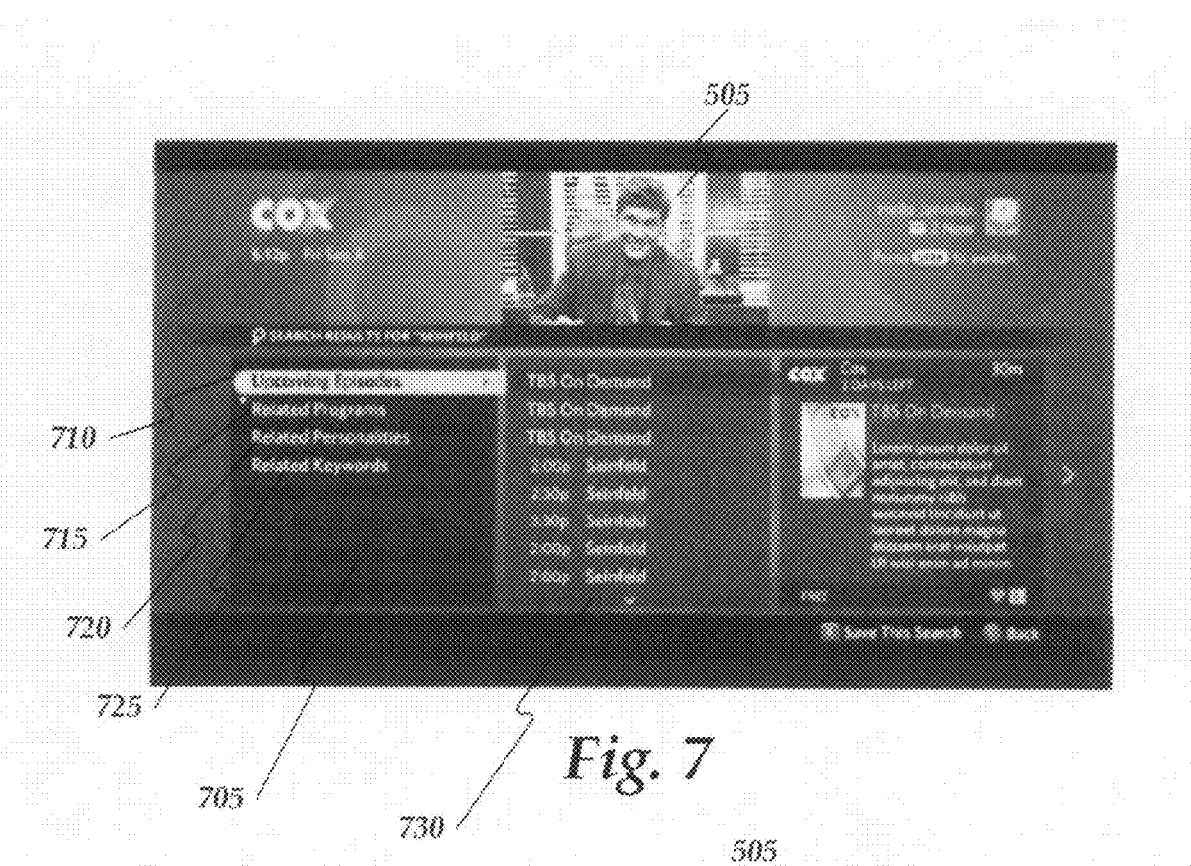
FIG. 7 is a diagram illustrating yet another media guide.

As will be described in greater detail below with respect to FIG. 7, FIG. 8, and FIG. 9, selecting the search action may cause a lateral search to be performed relative to a program selected in second card 520. The search action may allow the user to find related programs or other content. Furthermore, the search may allow the user to find the next time a program selected in second card 520 is airing so that the user may set a recording for example. Or the user may like a program selected in second card 520 and may use the search action to find similar programs in hopes of finding desirable content. Consistent with embodiments of the invention, a search may be initiated from a main menu with a single button press. However, a search may only be initiated from the media guide after right "arrowing" through the media guide to, for example, the screen shown in FIG. 6. FIG. 7 shows a search card 705 that may be displayed when the user selects the search action from card 605 (e.g. action card). As shown in FIG. 7, the search card may be configured to display a plurality of search options. The search options may comprise, but are not limited to, an upcoming episodes search option 710, a related programs search option 715, a related personalities search option 720, and a related key word search option 725. For example, when the user selects upcoming episodes search option 710, communications processor 125 may perform a search comprising searching for a future showing of the program of shrunken programming content 505. For example, in the case where the program is a series, the future showing may be the next episode of that particular series. In the case where the program is a movie (e.g. that may be on a pay movie channel) that is going to be repeated a plurality of times during a month, then this search may produce a list of all future showings that may be coming up in the future. This type search may be beneficial in setting-up a recording or sending the user a reminder to watch the future showing. Communications processor 125 may then display a results of this search in a results card 730.

Furthermore, when the user selects related programs search option 715, communications processor 125 may perform a search comprising searching for a future showing of another program that is in a same genre as the program of shrunken programming content 505. For example, if the genre of the program of shrunken programming content 505 is science fiction, the search may produce other science fiction programs available on system 100 in the future. Communications processor 125 may then display a results of this search. The genre compared may comprise, but is not limited to, action and adventure, adult movies, amateur, animation, blaxploitation, Christmas, classic Hollywood, comic book-based, cult movies, documentary, drama, family, film noir, horror, martial arts, miscellaneous, mockumentary, musicals, organized crime, science fiction and fantasy, Shakespearean, silent movies, sports, teen movies, war movies, or westerns.

Figure 8:
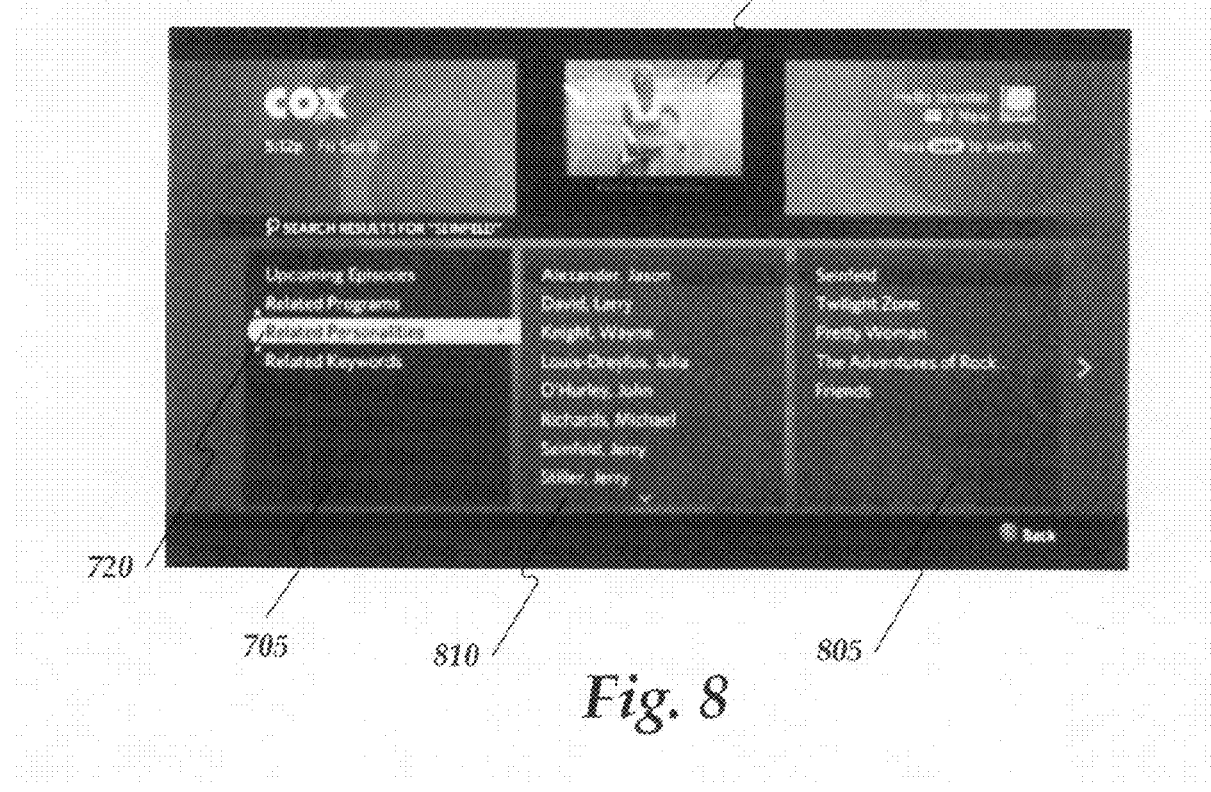
FIG. 8 is a diagram illustrating yet another media guide.
Figure 9:
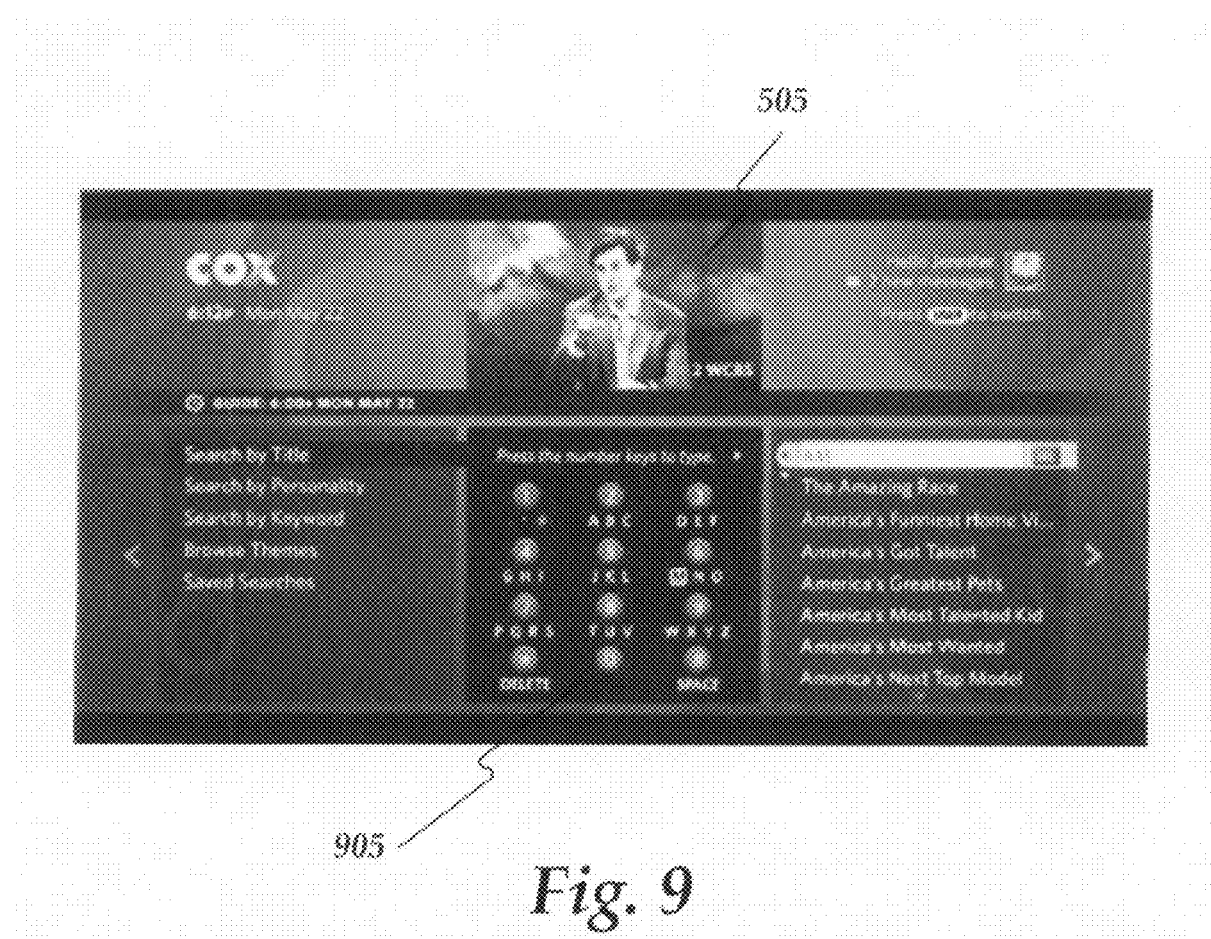
FIG. 9 is a diagram illustrating yet another media guide.

Moreover, as shown in FIG. 8, when the user selects related personalities search option 720 from search card 705, communications processor 125 may perform a search comprising searching for a future showing of another program having at least one personality in common with the program of shrunken programming content 505. Communications processor 125 may then display a results of this search in a results card 805. The personalities searched may comprise, but are not limited to, an actor, a character, a director, a producer, a writer, a soundtrack artist, a markup artist, or an advisor. For example, with this type search, an actor's name that may be in the program of shrunken programming content 505 can be used to find other shows or movies available on system 100 in the future that may have the actor in common. Given the example of FIG. 8, the program of shrunken programming content 505 may comprise Seinfeld, thus a card 810 may show actors in this Seinfeld program. If the user selects Jason Alexander from card 810, results card 805 may show Jason Alexander may be in an upcoming (or currently showing) Twilight Zone episode for example.

When the user selects related key word search option 725 from search card 705, communications processor 125 may display to the user a key word input card 905. From key word input card 905 the user may enter, and communications processor 125 may subsequently receive, the key word. After the key word is received, communications processor 125 may perform a search for a future showing of another program corresponding to the key word. Communications processor 125 may then display a results of this search. The key word may correspond to the program of shrunken programming content 505. For example, the program of shrunken programming content 505 may comprise a Seinfeld episode. The key word may comprise, for example, "low talker." Consequently, this search may produce other Seinfeld episodes available on system 100 in the future (or currently showing) that may have the "low talker" in them.

Moreover, consistent with embodiments of the invention, if a user selects a title that is returned as part of a search result, the user may be presented with a screen in the format shown in FIG. 6 that contains information and an action panel corresponding to the selected title. From the action panel on this screen, the user can then conduct another search. Consequently, if the user selects a new title from the search results, a new screen (similar to FIG. 6) relevant to that new title may be displayed. Then another search may be conducted from the resulting screen's action panel. This process may be repeated. Accordingly, a lateral search may be performed in a repeated endless way (linking multiple pieces of content in the system together) as long as there is content in the system that is related to the currently selected title for example.

In addition, the user may find a program selected in second card 520 desirable. Consequently, the user may wish to select the add to my picks action so that the user's friends (e.g. buddies that the user has previously identified) can see that the user likes the program selected in second card 520. Accordingly, ones of the user's friends might have an interest in viewing the program selected in second card 520. In addition, the user may send an recommendation to a particular friend who the user believes may have an interest in the program selected in second card 520. Selecting the send an invitation action may allow the user to send this recommendation. Furthermore, selecting the rate program action may allow the user to give their own rating or opinion regarding the program selected in second card 520.

Fifth card 615 in FIG. 6 shows an example fifth content element. The fifth content element may be configured to display, for example, an advertisement or information relative to one of the plurality of actions. For example, the service provider may configure the fifth content element to display an advertisement for goods or services related to shrunken programming content 505. The advertisement may offer for sale merchandise related to shrunken programming content 505. For example, if shrunken programming content 505 includes a sporting event, the fifth content element may display an advertisement for team logo merchandise for teams in the shown sporting event. Furthermore, the advertisement may show upcoming programs to be presented on selected one of the plurality of available programming channels 545. Notwithstanding, the fifth content element may be configured to display any advertisement.

Furthermore, the fifth content element may be configured to display, for example, information relative to the one of the plurality of actions selected in the fourth content element. The information may provide instructions on performing one of the plurality of actions selected in the fourth content element. For example, if the selected action in the fourth content element, is simple (e.g. a watch now action), the fifth content element may be configured to display an advertisement. However, if the selected action in the fourth content element is more complicated, the fifth content element may be configured to display instructions on performing the selected action. For example, if the selected action in the fourth content element comprises a search action, then the fifth content element may be configured to display instructions on performing the search action.

From stage 340, where communications processor 125 displays media guide 510, method 300 may advance to stage 350 where communications processor 125 may receive a second input. For example, communications processor 125 may receive the second input in response to the user selecting (e.g. using control device 175) a first user selectable element 530 as shown if FIG. 5 or a second user selectable element 620 as shown in FIG. 6.

Once communications processor 125 receives the second input in stage 350, method 300 may continue to stage 360 where communications processor 125 may re-display at least a portion of media guide 510. For example, If the user selects first user selectable element 530 twice, the cards shown in FIG. 5 may scroll to the left two places. As a result, third card 525 may shift (scroll) from the right-most position (as shown in FIG. 5) to the left-most position (as shown in FIG. 6). In this way, media guide 510 may be re-displayed with different ones of the first content element, the second content element, the third content element, the fourth content element, and the fifth content element filling the at least three display elements comprising media guide 510. Furthermore, if the user selects a third user selectable element 535 as shown in FIG. 5, programming content 405 on TV 155 may be redisplayed thus showing a full view of the content (e.g. instead of shrunken programming content 505) and removing media guide 510 from view and introducing a main menu. If the user selects a fourth user selectable element 535, the main menu may be removed and a full view of programming content 405 may be visible. Once communications processor 125 re-displays at least a portion of media guide 510 in stage 360, method 300 may then end at stage 370.

FIG. 10 shows a plurality of content element examples. The plurality of content element shown in FIG. 10 are examples and others may be used. As described above. FIG. 10 shows examples of first card 515, second card 520, third card 525, fourth card 605, and fifth card 615. In addition, FIG. 10 shows examples of a sixth card 1005, a seventh card 1010, an eighth card 1015, a ninth card (e.g. input card 905, as described above), a tenth card 1025, an eleventh card 1030, and a twelfth card 1035. Consistent with embodiments of the invention, there may be two types of cards, list cards and information cards. Any of the plurality of content elements shown in FIG. 10 may be used and tabbed through the three display elements as described above with respect to FIG. 3.

As described above, list cards may contain list items and optionally may contain icons. Lists items and icons may always be selectable. For example, first card 515 may comprise a channel card containing a list of channels. Second card 520 may comprise a program card containing a list of programs found on a particular channel. Eighth card 1015 may comprise a directory card containing a list of directories. For example, an "On Demand" branch can have FreeZone, Premium Networks, and Movies on Demand directories that in turn can have their own subdirectories. Tenth card 1025 may comprise a search results card that may comprise a special type of list card that may contain a search text box at the top and list items at the bottom. Eleventh card 1030 may comprise a people card containing a list of users in a household or buddies. Each item in eleventh card 1030 may be supplemented with an avatar or icon. Twelfth card 1035 may comprise a club card that may be similar to the people card except that it may contain a list of clubs.

Information cards may contain static information such as a summary of a program, instructional text, or an ID of a program. Information cards may not be selectable. For example, third card 525 may comprise a summary card containing information about objects such as broadcast programs or interactive television applications. Sixth card 1005 may comprise an ID card containing branding and promotional information for entities that may: i) have special client driven display needs; or ii) have a child tree. On Demand channels may be an example of an object with an ID card. ID cards may be, for example, signposts in the tree. Seventh card 1010 may comprise a comment card contain tooltip-style help text and status information about a particular leaf-level action. For example, the comment card for a "Send An Interactive TV Invitation" action may at first explain the feature, then after the invitation has been sent, display when it was sent and to whom. Most, but not all leaf-level actions have comment cards. Actions without comment cards may be referred to as terminal. Fifth card 615 may comprise a promo card containing advertising or other promotional information. Promo cards may appear in context with actions that do not have an associate comment card (e.g., Watch Now in the Guide.) Ninth card may comprise a text entry card containing a keyboard representation. In is example, a number pad may be represented on the card. The first child of the text entry card may be a selected form field. When the user types using, for example, a number key on device 175, the typing may appear in a text field.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a search, the method comprising:

displaying, by a computer, a media guide comprising at least one display element comprising an action card configured to display a plurality of actions that can be taken with respect to a selected program, one of the plurality of actions comprising a search action;

displaying, in response to a user selecting a user selectable element corresponding to the search action on the action card, a search card, the search card configured to display a plurality of search options consisting of the following: an upcoming episodes search option, a related programs search option, a related personalities search option, and a related key word search option; and performing, in response to the user selecting a user selectable element corresponding to the related programs search option, a search comprising searching for one of the following: a current showing of the selected program that is in a same genre as the selected program and a future showing of another program that is in the same genre as the selected program; and displaying a results of the search.

2. The method of claim 1, further comprising:
performing, in response to the user selecting a user selectable element corresponding to the upcoming episodes search option, a search comprising searching for one of the following: a current showing of the selected program and a future showing of the selected program; and
displaying a results of the search.

3. The method of claim 1, further comprising:
performing, in response to the user selecting a user selectable element corresponding to the related programs search option, a search comprising searching for one for the following: a current and future showing of another program that is in a same genre as the selected program, the same genre comprising at least one of the following: action and adventure, adult movies, amateur, animation, blaxploitation, Christmas, classic Hollywood, comic book-based, cult movies, documentary, drama, family, film noir, horror, martial arts, miscellaneous, mockumentary, musicals, organized crime, science fiction and fantasy, Shakespearean, silent movies, sports, teen movies, war movies, and westerns; and
displaying a results of the search.

4. The method of claim 1, further comprising:
performing, in response to the user selecting a user selectable element corresponding to the related personalities search option, a search comprising searching for one for the following: a current and future showing of another program having at least one personality in common with the selected program; and
displaying a results of the search.

5. The method of claim 1, further comprising:
performing, in response to the user selecting a user selectable element corresponding to the related personalities search option, a search comprising searching for one for the following: a current and future showing of another program having at least one personality in common with the selected program, the at least one personality comprising one of the following: an actor, a character, a director, a producer, a writer, a soundtrack artist, a markup artist, and an advisor; and
displaying a results of the search.

6. The method of claim 1, further comprising performing, in response to the user selecting a user selectable element corresponding to the related key word search option, a search comprising:
receiving a key word from the user;
performing a search for one for the following: a current and future showing of another program corresponding to the key word; and
displaying a results of the search.

7. The method of claim 6, wherein receiving the key word from the user comprises receiving the key word corresponding to the selected program.

8. The method of claim 1, wherein displaying the media guide comprises displaying the media guide in response to a received first input.

9. The method of claim 8, wherein displaying the media guide in response to the received first input comprises displaying the media guide in response to the first input received from a control device.

10. The method of claim 1, wherein displaying the media guide comprises:
shrinking the selected program being currently displayed; and
displaying the shrunken selected program concurrently with the media guide.

11. The method of claim 10, wherein displaying the shrunken selected program concurrently with the media guide comprises displaying the shrunken selected program concurrently with the media guide to fit at least the width of a high-definition television (HDTV) display.

12. A computer-readable storage medium which stores a set of instructions which when executed performs a method for providing a search, the method executed by the set of instructions comprising:
receiving a first input;
shrinking, in response to the received first input, a currently displayed programming content;
displaying the shrunken programming content;
displaying, in response to the received first input and concurrent with the shrunken programming content, a media guide comprising at least one display element comprising an action card configured to display a plurality of actions that can be taken with respect to the currently displayed programming content, one of the plurality of actions comprising a search action;
displaying, in response to a user selecting a user selectable element corresponding to the search action on the action card, a search card, the search card configured to display a plurality of search options consisting of the following: an upcoming episodes search option, a related programs search option, a related personalities search option, and a related key word search option; and
performing, in response to the user selecting a user selectable element corresponding to the related programs search option, a search comprising searching for one of the following: a current showing of another program that is in a same genre as the currently displayed programming content and a future showing of another program that is in the same genre as the currently displayed programming content; and
displaying a results of the search.

13. The computer-readable storage medium of claim 12, further comprising performing, in response to the user selecting a user selectable element corresponding to the upcoming episodes search option, a search comprising searching for one for the following: a current and future showing of the currently displayed programming content.

14. The computer-readable storage medium of claim 12, further comprising performing, in response to the user selecting a user selectable element corresponding to the related programs search option, a search comprising searching for one for the following: a current and future showing of another program that is in a same genre as the currently displayed programming content, the same genre comprising at least one of the following: action and adventure, adult movies, amateur, animation, blaxploitation, Christmas, classic Hollywood, comic book-based, cult movies, documentary, drama, family, film noir, horror, martial arts, miscellaneous, mockumentary, musicals, organized crime, science fiction and fantasy, Shakespearean, silent movies, sports, teen movies, war movies, and westerns.

15. The computer-readable storage medium of claim 12, further comprising performing, in response to the user selecting a user selectable element corresponding to the related personalities search option, a search comprising searching for one for the following: a current and future showing of another program having at least one personality in common with the currently displayed programming content.

16. The computer-readable storage medium of claim 12, further comprising performing, in response to the user selecting a user selectable element corresponding to the related personalities search option, a search comprising searching for another program having at least one personality in common with the currently displayed programming content, the at least one personality comprising one of the following: an actor, a character, a director, a producer, a writer, a soundtrack artist, a markup artist, and an advisor.

17. The computer-readable storage medium of claim 12, further comprising performing, in response to the user selecting a user selectable element corresponding to the related key word search option, a search comprising:
   receiving a key word from the user; and
   searching for one for the following: a current and future showing of another program corresponding to the key word.

18. A system for providing a search, the system comprising:
   a memory storage; and
   a processing unit coupled to the memory storage, wherein the processing unit is operative to:
      display, in response to a user selecting a user selectable element corresponding to a search action on an action card, a search card, the search card configured to display a plurality of search options consisting of the following: an upcoming episodes search option, a related programs search option, a related personalities search option, and a related key word search option; and
      perform, in response to the user selecting a user selectable element corresponding to the related programs search option, a search comprising searching for one of the following: a current showing of the selected program that is in a same genre as the selected program and a future showing of another program that is in the same genre as the selected program; and
      display a results of the search.

* * * * *